Dec. 10, 1935.  J. J. SCHAEFER  2,024,064
RAWHIDE SCREW ANCHOR PLUG
Filed Aug. 1, 1934
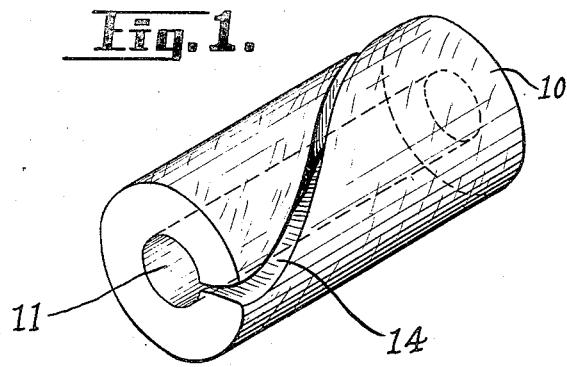
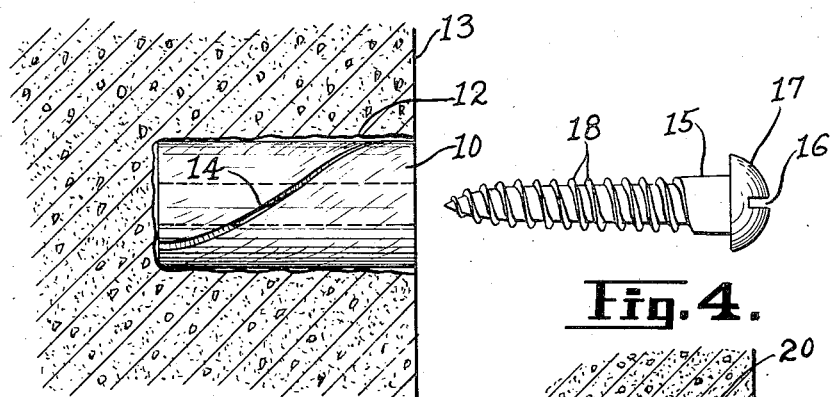
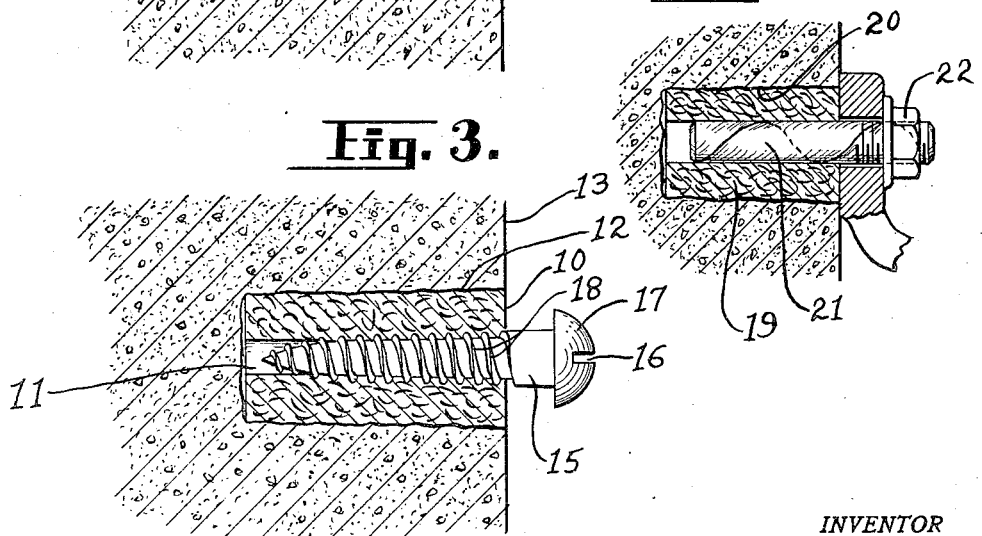
INVENTOR
Justus J. Schaefer.
BY
H. G. Manning
ATTORNEY Patented Dec. 10, 1935

2,024,064

UNITED STATES PATENT OFFICE 2,024,064

RAWHIDE SCREW ANCHOR PLUG

Justus J. Schaefer, Great Barrington, Mass.

Application August 1, 1934, Serial No. 737,918

2 Claims. (Cl. 85—2.4)

This invention relates to screw anchors, and more particularly to a hollow non-frangible expansible anchor plug of hard-cured rawhide for securing screws, hooks, nails, etc., permanently and securely in a cylindrical socket formed in a wall or floor of concrete, plaster, brick, tile, marble, slate, wood, wall-board, steel, or any other structural material.

One object of this invention is to provide a rawhide anchor plug which is split along a helical line extending from one end to the other to permit uniform radial expansion thereof.

A further object is to provide a split hollow non-frangible anchor plug of relatively hard, tough resilient, flexible rawhide in which a screw is adapted to be driven, the nature of the material of the plug permitting the screw to cut its own threads when screwed therein, whereby the plug is rendered self-tapping.

A further object is to provide a device of the above nature which will be simple in construction, inexpensive to manufacture, easy to install and manipulate, compact, and very efficient and durable in use.

With these and other objects in view there has been illustrated on the accompanying drawing one form in which the invention may be conveniently embodied in practice.

In the drawing:

Fig. 1 represents a perspective view of a rawhide screw anchor plug embodying the invention.

Fig. 2 is a longitudinal sectional view of a portion of a concrete wall having a socket within which the rawhide anchor plug is shown loosely fitted just prior to the driving in of a tapered screw.

Fig. 3 is a view similar to Fig. 2, showing the appearance of the rawhide anchor plug in expanded condition after the screw has been driven into final locked position.

Fig. 4 is a longitudinal sectional view of a modified form of the invention in which a solid plug is shown driven into the anchor and a nut is screwed on the end of said plug.

It has been customary in the past to construct screw anchor plugs either from solid blocks of wood, fabricated fibrous material, or split sleeves of soft metal such as lead. Such anchor plugs have proven to be unsatisfactory owing to the relatively soft and yielding character of the material which permitted the screws to pull out of the plugs, and the plugs to loosen in their sockets when any substantial amount of force was applied to said screws.

Moreover, wooden and fibrous anchor plugs were subject to rapid disintegration when exposed to moisture, and changes in the weather.

By means of the present invention, the above and other disadvantages have been avoided by the use of a screw anchor plug formed of tough durable hard-cured rawhide as distinguished from the relatively soft flexible leather-like rawhide used for lacing and the like, so that such plug when inserted in a socket, will hold the screw tightly without pulling out, and will not be subject to deterioration even under severe moisture or weather conditions.

A further advantage of the present invention is that greater tolerances in the diameter and length of the split anchor plugs will be permitted in the manufacture thereof due to the ability of this material, to flow into intimate contact with as well as the greater frictional grip of such material upon the screw and the surface of the socket, than was present the case in former screw anchor plugs.

Referring now to the drawing in which like reference numerals denote corresponding parts throughout the several views, the numeral 10 indicates the rawhide screw anchor plug in its original shape before it has been inserted in the wall socket. The plug 10 is in the form of a short hollow cylinder of solid rawhide having an interior cylindrical bore 11, which may be formed by drilling from an originally solid cylindrical block of twisted rawhide, or in any other manner.

In order to permit the screw to fit smoothly within the socket 12 of a block 13 of concrete or any other structural wall or floor material, provision is made of a helical slit 14 extending through the thickness of one side of the anchor plug, and running throughout the entire length thereof.

By means of this construction, the plug 10 may be inserted loosely into the socket 12, and is adapted to receive a screw 15, herein shown as a tapered wood screw. When the screw is driven home, by the use of a screw-driver (not shown) engaged in the slot 16 in the screw head 17, the threads 18 of the screw will imbed themselves in the yielding tough interior wall of the bore 11 of the anchor plug, tapping their own interior threads in said bore. When the screw reaches the position shown in Fig. 3, the clamping action of the rawhide plug upon the side walls of the socket 12 and the thread 18 of the screw 15 will be so great that it will be practically impossible to remove the screw except by twisting it with a screw driver in the opposite direction. In fact, if it is attempted to remove the screw upon the plug by a direct pull, it has been found in practice that the head of the screw will be pulled off in most instances without loosening the screw in any manner.

If desired, however, the bore of the plug 10 may be tapped for receiving a machine screw instead of the wood screw 15, or the plug 10 may be exteriorly threaded to fit a tapped wall socket.

One advantage of the present invention is that the screw or other suspending member may be very rapidly installed owing to the high expansibility of the rawhide which permits the plugs to be made considerably smaller than the sockets within which they are to be inserted. Thus, the plugs may be placed in said sockets by hand without the use of hammers or other tools.

In Fig. 4 a modified form of the invention is disclosed in which a helically split rawhide anchor sleeve 19 is embedded within a cylindrical wall socket 20. A smaller solid plug 21, which may be of helical twisted rawhide or other material which is slightly expansible, and which has an exterior diameter greater than the internal diameter of the sleeve, will then be forcibly driven, as by the blows of a hammer, into the sleeve to the position shown on the drawing. The end of said solid plug 21 is threaded to permit the reception of a nut 22 screwed thereon for suspending any desired article. The use of an expansible plug of this nature makes it quite difficult to remove the nut by unscrewing it in the reverse direction. To complete the assembly, the end of the threaded plug will be struck several blows with a hammer to slightly head the rawhide plug over upon the nut and securely lock the parts in assembled position. If desired, the inner end of the plug may be chamfered to facilitate its insertion into the rawhide sleeve 19.

Another feature of advantage is that the rawhide anchor plugs are of such a durable material that they may be used repeatedly over and over again.

A further advantage is that an anchor plug made of rawhide according to the present invention cannot become raveled or frayed in use and can be practically water-proof and weather-proof.

The plug is also of such a nature that a very uniform clamping pressure is exerted upon the wall socket in which it is installed.

It will be understood that the invention is not limited to the use of tapered screws, but screws of uniform diameter may be employed within the spirit and scope of the invention.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a screw anchor plug, a hollow split expansible cylinder formed of a continuous piece of relatively hard tough resilient rawhide adapted to be expanded into tight frictional engagement with the sides of a socket when a screw is driven therein.

2. In a screw anchor plug, a hollow split expansible cylinder of a continuous piece of relatively hard tough resilient rawhide adapted to be expanded into tight frictional engagement with the sides of a socket when a screw is driven therein, said cylinder having a continuous helical slit extending throughout its length, said slit at all points in its length being radially directed toward the axis of said cylinder to permit free uniform radial expansion.

JUSTUS J. SCHAEFER.